(12) United States Patent  (10) Patent No.: US 8,955,808 B2
Buschbach  (45) Date of Patent: Feb. 17, 2015

(54) SUPPORT SYSTEMS FOR HOLDING ITEMS

(71) Applicant: Terry A. Buschbach, Cary, NC (US)

(72) Inventor: Terry A. Buschbach, Cary, NC (US)

( * ) Notice: Subject to any disclaimer, the term of this patent is extended or adjusted under 35 U.S.C. 154(b) by 0 days.

(21) Appl. No.: 14/011,791

(22) Filed: Aug. 28, 2013

(65) Prior Publication Data

US 2014/0014795 A1    Jan. 16, 2014

(51) Int. Cl.
    A47B 96/06    (2006.01)
    F16M 13/02    (2006.01)
    F21V 21/10    (2006.01)
    F21V 21/108   (2006.01)
    F21S 13/02    (2006.01)
    E04F 11/18    (2006.01)

(52) U.S. Cl.
    CPC ............... *F16M 13/02* (2013.01); *F21S 13/02* (2013.01); *F21V 21/10* (2013.01); *F21V 21/108* (2013.01); *E04F 2011/1872* (2013.01); *E04F 2011/188* (2013.01)
    USPC ........... 248/214; 248/200; 248/175; 248/27.8

(58) Field of Classification Search
    USPC ............. 248/214, 215, 200, 175, 176.1, 27.8
    See application file for complete search history.

(56) References Cited

U.S. PATENT DOCUMENTS

| | | | |
|---|---|---|---|
| 1,298,380 A | | 3/1919 | Owen |
| 1,340,273 A | | 5/1920 | Jones |
| 1,664,658 A | | 4/1928 | Blazer |
| 1,809,018 A | * | 6/1931 | Bruning ...................... 248/214 |
| 1,931,376 A | | 10/1933 | Cosner |
| 1,997,870 A | | 4/1935 | Merrill |
| 2,318,930 A | * | 5/1943 | Dietrich ........................ 211/119 |
| 2,504,583 A | * | 4/1950 | Rachic ......................... 248/313 |
| 2,605,067 A | | 7/1952 | Lindsell |
| 2,653,002 A | | 9/1953 | Passman |
| 2,764,384 A | * | 9/1956 | Kirsch .......................... 248/305 |
| 2,774,562 A | * | 12/1956 | Henry ........................ 248/125.1 |
| 2,905,414 A | | 9/1959 | Zierden |
| 2,938,304 A | | 5/1960 | Thomas et al. |
| 3,038,689 A | | 6/1962 | Matson |
| 3,711,048 A | * | 1/1973 | Thalenfeld .................. 248/309.1 |
| 3,802,657 A | * | 4/1974 | Jackson ........................ 248/214 |
| 3,888,354 A | * | 6/1975 | Margolin et al. ............. 211/110 |
| 4,014,056 A | | 3/1977 | Wainwright |
| 4,098,483 A | * | 7/1978 | Pesola et al. ................ 248/311.2 |
| 4,124,190 A | * | 11/1978 | Wheeler ....................... 248/538 |
| 4,131,079 A | * | 12/1978 | Rousseau et al. ........... 116/22 A |
| 4,286,409 A | | 9/1981 | Taylor et al. |
| 4,415,137 A | * | 11/1983 | Garves .......................... 248/629 |
| 4,436,272 A | | 3/1984 | Lile et al. |
| 4,524,542 A | * | 6/1985 | Elliott ............................ 47/67 |
| 4,829,926 A | | 5/1989 | Voelkel |
| D303,018 S | | 8/1989 | Yates |
| 4,901,971 A | | 2/1990 | Connelly |
| 4,908,982 A | * | 3/1990 | Quatrini ........................ 47/39 |
| 4,991,344 A | * | 2/1991 | Carney ........................... 47/39 |
| 5,009,380 A | * | 4/1991 | Fee ............................... 248/214 |
| 5,014,461 A | | 5/1991 | vom Braucke et al. |
| 5,074,514 A | | 12/1991 | Smith |
| 5,137,246 A | | 8/1992 | Idso |
| 5,313,910 A | | 5/1994 | Wittman |

(Continued)

*Primary Examiner* — Monica Millner
(74) *Attorney, Agent, or Firm* — Olive Law Group, PLLC

(57) ABSTRACT

Support systems for supporting an item on railings of a deck or other structures are disclosed. According to an aspect, a support system is attached to the railings at one end and at least one more additional point. The other end of the support system extends outwardly from the railing to support an item, such as a torch, a lamp, a lantern, a candle, and a plant basket.

2 Claims, 9 Drawing Sheets

(56) References Cited

U.S. PATENT DOCUMENTS

| | | | |
|---|---|---|---|
| 5,320,319 A | 6/1994 | Winger et al. | |
| 5,327,676 A | 7/1994 | Kosky | |
| 5,395,081 A | 3/1995 | Vollink | |
| 5,443,234 A | 8/1995 | Woods | |
| 5,452,877 A | 9/1995 | McCeney et al. | |
| 5,492,297 A * | 2/1996 | Underwood | 248/340 |
| 5,711,433 A * | 1/1998 | Smith | 211/71.01 |
| 5,782,453 A | 7/1998 | Barrie et al. | |
| 5,791,331 A | 8/1998 | Stewart | |
| 5,826,852 A * | 10/1998 | McKeown | 248/519 |
| 5,918,849 A | 7/1999 | Bliss | |
| 5,938,168 A | 8/1999 | Adams | |
| 5,941,486 A | 8/1999 | Riblet | |
| 5,970,655 A | 10/1999 | Freeman | |
| 6,050,532 A * | 4/2000 | Paul | 248/214 |
| 6,065,727 A * | 5/2000 | Fitzgerald et al. | 248/302 |
| 6,102,349 A * | 8/2000 | Hall | 248/312.1 |
| 6,145,795 A | 11/2000 | McAdam et al. | |
| 6,168,125 B1 * | 1/2001 | Winger et al. | 248/228.3 |
| 6,202,964 B1 * | 3/2001 | Thornhill | 248/219.4 |
| 6,209,267 B1 | 4/2001 | Dantzer | |
| 6,217,316 B1 * | 4/2001 | Yeh | 431/343 |
| 6,299,124 B1 | 10/2001 | Reback et al. | |
| 6,494,438 B1 | 12/2002 | Noirot et al. | |
| D472,653 S | 4/2003 | Northrop | |
| 6,557,806 B2 * | 5/2003 | Davies | 248/121 |
| 6,585,398 B1 | 7/2003 | Haddad | |
| 6,615,543 B1 | 9/2003 | Palsrok | |
| 6,676,094 B1 * | 1/2004 | Brown | 248/214 |
| 6,676,278 B2 | 1/2004 | Striebel et al. | |
| 6,702,245 B1 | 3/2004 | Otterman | |
| 6,708,832 B1 * | 3/2004 | Hannon | 211/107 |
| 6,715,725 B2 | 4/2004 | Chipka | |
| 6,745,991 B1 | 6/2004 | Rush | |
| 6,895,713 B2 * | 5/2005 | Warren | 47/39 |
| 6,904,719 B2 | 6/2005 | Braun | |
| 6,923,615 B2 | 8/2005 | Crinion | |
| 6,948,283 B2 | 9/2005 | Burkart et al. | |
| 7,036,451 B1 | 5/2006 | Hutchinson | |
| 7,040,592 B1 | 5/2006 | Thomas | |
| 7,052,170 B2 | 5/2006 | Striebel | |
| 7,080,925 B1 | 7/2006 | Rushing | |
| 7,168,437 B2 | 1/2007 | Bigford | |
| 7,168,843 B2 | 1/2007 | Striebel | |
| 7,278,240 B2 | 10/2007 | Burkart et al. | |
| 7,506,466 B2 * | 3/2009 | Betham et al. | 40/606.01 |
| 7,533,506 B2 | 5/2009 | Platt | |
| 7,543,542 B2 | 6/2009 | Jakobsson | |
| 7,543,802 B2 | 6/2009 | Petta et al. | |
| 7,562,853 B2 * | 7/2009 | Mazzola | 248/311.2 |
| 7,597,293 B2 * | 10/2009 | Houghtaling | 248/175 |
| 7,640,692 B1 | 1/2010 | Baynard | |
| 7,690,151 B2 | 4/2010 | Wilkes | |
| 7,690,612 B1 * | 4/2010 | Branson | 248/302 |
| 7,731,160 B2 | 6/2010 | Terrels et al. | |
| 7,740,216 B1 * | 6/2010 | Puckett et al. | 248/230.5 |
| 7,845,604 B2 * | 12/2010 | Connor, Jr. | 248/215 |
| 7,913,960 B1 | 3/2011 | Herr, III et al. | |
| 7,997,545 B2 | 8/2011 | Holland | |
| 8,037,839 B2 | 10/2011 | Thistle | |
| 8,056,495 B2 | 11/2011 | Lemons | |
| 8,091,853 B2 | 1/2012 | Clores | |
| 8,167,275 B1 | 5/2012 | Bizzarri et al. | |
| 8,196,882 B2 | 6/2012 | Antus, Jr. | |
| D668,379 S | 10/2012 | Storey | |
| 8,336,837 B2 | 12/2012 | Gephart et al. | |
| 8,430,366 B2 * | 4/2013 | Tincher | 248/214 |
| 8,505,862 B2 | 8/2013 | MacKay et al. | |
| 8,561,345 B2 * | 10/2013 | Armas | 47/39 |
| 2002/0000504 A1 * | 1/2002 | Bayne | 248/302 |
| 2002/0020791 A1 | 2/2002 | Kempf et al. | |
| 2002/0145092 A1 * | 10/2002 | Davies | 248/231.41 |
| 2003/0173474 A1 * | 9/2003 | Taylor | 248/156 |
| 2004/0045217 A1 | 3/2004 | Chiddick et al. | |
| 2005/0258318 A1 * | 11/2005 | Mori | 248/175 |
| 2006/0016943 A1 * | 1/2006 | Thompson | 248/175 |
| 2007/0108363 A1 * | 5/2007 | Metheny | 248/539 |
| 2007/0145208 A1 * | 6/2007 | Beaver | 248/175 |
| 2008/0035826 A1 | 2/2008 | Clores et al. | |
| 2008/0245937 A1 * | 10/2008 | Connor | 248/215 |
| 2009/0100789 A1 | 4/2009 | Hornbeak et al. | |
| 2009/0224118 A1 * | 9/2009 | Meyers | 248/215 |
| 2010/0313471 A1 | 12/2010 | Middaugh | |
| 2011/0303809 A1 * | 12/2011 | Tincher | 248/214 |

* cited by examiner

SUPPORT SYSTEMS FOR HOLDING ITEMS

TECHNICAL FIELD

The presently disclosed subject matter is directed towards support systems, and, more particularly, support systems for holding items on railings or other structures.

BACKGROUND

In an open space such as a patio or a garden, a system for holding an item, such as a torch, a lamp, a lantern, a candle, and a basket, is useful. Many systems for holding such items exist and are often situated to stand in an upright position on the ground. There are generally two ways to secure a support system on the ground: to install one end of a system into the ground, and to attach a base to a system and have it stand on the base. A ground-based support system can be useful in supporting an item in a patio, a garden, or other spaces.

An increasing number of homes have decks instead of or in addition to patios or gardens. A ground-based system may not be suitable to support an item on an elevated surface such as a deck for several reasons. In one example, systems of a ground-installing type are not mountable on a deck floor.

Another difficulty presented by existing systems is that systems of a base-type, although mountable on a deck floor, can occupy a significant portion of a deck space. If a support system is placed in the middle of a deck, it can hinder people's movement across the deck. If a support system is place at the edge of a deck near railings, it can prevent people from standing or sitting near railings and enjoying the view of a garden from a deck.

Still another disadvantage of existing support systems is a safety issue resulting from an upright supporting of an item. An item such as a torch, a candle, or a flower basket hangs right above people's head and within the reach of children. An item in this position could injure people, and people could damage an item.

In view of the foregoing, there remains a need for improved support systems for holding items.

SUMMARY

Disclosed herein are support systems for holding items. According to an aspect, a system can be attached to a railing of a deck or another space and can support an item, such as torch, a lamp, a lantern, a candle, a basket, and the like.

According to another aspect, a support system comprises a first member and a second member. The first member includes a first end and a second end, the first end including an attachment member for supporting an item, and the second end being configured to engage a first portion of a railing being positioned substantially vertically such that the first member and the vertical direction form an angle. The second member includes a first end and a second end, the first end of the second member being attached to the first member between the first and second ends of the first member, and the second end of the second member configured to be engaged to the railing at a second portion higher than the first portion of the railing.

According to another aspect, the second end of the first member of the support system includes a railing-engaging member and comprises a third member and a pair of members. The third member has a first end and a second end, and is attached between its first and second ends to the second end of the first member. Each of the pair of members is attached to the first and second ends of the third member. The pair extends therefrom substantially in parallel with and substantially toward the same direction as the second member.

According to another aspect, the second end of the first member of the support system includes a railing-engaging member and comprises a first substantially flat member and a pair of substantially flat members. The first substantially flat member is attached to the second end of the first member substantially perpendicular to the second member. Each of the pair of substantially flat members is securely attached respectively to a first end and a second end of the first substantially flat member, the pair extending therefrom in parallel.

According to another aspect, each of the pair of substantially flat members further defines a hole, wherein the rail-engaging member is placed along and onto a railing, and a rod-shaped object is inserted through the defined holes to securely attach the support system thereto.

According to another aspect, the second end of the first member of the support system includes a rail-engaging member and comprises a substantially flat member that is securely attached to the second end of the first member and is positioned substantially perpendicular to the second member.

According to another aspect, the substantially flat member defines a plurality of holes and is configured to be placed onto a railing. A pin-shaped object is inserted through the holes into a structure of the railing to attach the support system thereto.

According to another aspect, the second end of the second member of the support system includes a railing-engaging member and comprises a third member having a first and a second end, attached to the second end of the second member at its first end, and extending substantially downwardly therefrom, and a flat member securely attached to the second end of the third member and positioned substantially perpendicularly thereon.

According to another aspect, the second end of the second member of the support system includes a rail-engaging member and comprising a flat member attached to the second end of the second member and positioned substantially perpendicularly thereon.

According to another aspect, the flat member defines a plurality of holes and is placed onto a railing, and a pin-shaped object is inserted through the holes into the structure of the railing to attach the support system thereto.

According to another aspect, the second end of the second member of the support system includes a railing-engaging member and comprising a first substantially flat member securely attached to the second end of the second member substantially perpendicularly thereon, and a pair of substantially flat members, each of the pair attached respectively to a first and a second end of the first flat member, the pair extending therefrom in parallel.

According to another aspect, each of the pair of substantially flat members defines a hole. A line between the holes is substantially perpendicular to the pair of flat members. The rail-engaging member is placed along and onto a railing, and a rod-shaped object is inserted through the two holes to securely attach the support system thereto.

According to another aspect, the first member defines an angled portion near its attachment-member end, such that the attachment-member-end portion of the first member extends substantially perpendicular to the second member and, when the support system is attached onto railings, the attachment member extends substantially outwardly and vertically upwardly therefrom.

According to another aspect, the support system comprises a primary member having a first end and a second end. The first end includes an attachment member for supporting an item, and the second end configured to engage a first portion of a railing. The primary member defines first and second angled portions and comprises three consecutive parts marked by the bends comprising a first part comprising the attachment-member end and extending substantially upwardly, a second part extending substantially horizontally and being supported on a horizontal surface of a railing, and a third part comprising the rail-engaging end and extending substantially downwardly.

According to another aspect, the support system further comprises a plurality of support members each including a first and a second end. The first end of a support member is attached to the first part of the primary member, and the second end of a support member is attached to the second part of the primary member and positioned on a railing supporting the second part of the primary member.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different elements similar to the ones described in this document, in conjunction with other present or future technologies. Like numbers refer to like elements throughout.

It is to be understood that the terminology used herein is for the purpose of describing particular embodiments only and is not intended to limit the scope of the present invention. In this specification and in the claims that follow, reference will be made to a number of terms that shall be defined to have the following meanings As used herein unless otherwise specified, "railings" refers to railings, balusters, or fences, or other vertical structures of a deck, a balcony, a patio, or other spaces.

Figure 1A:
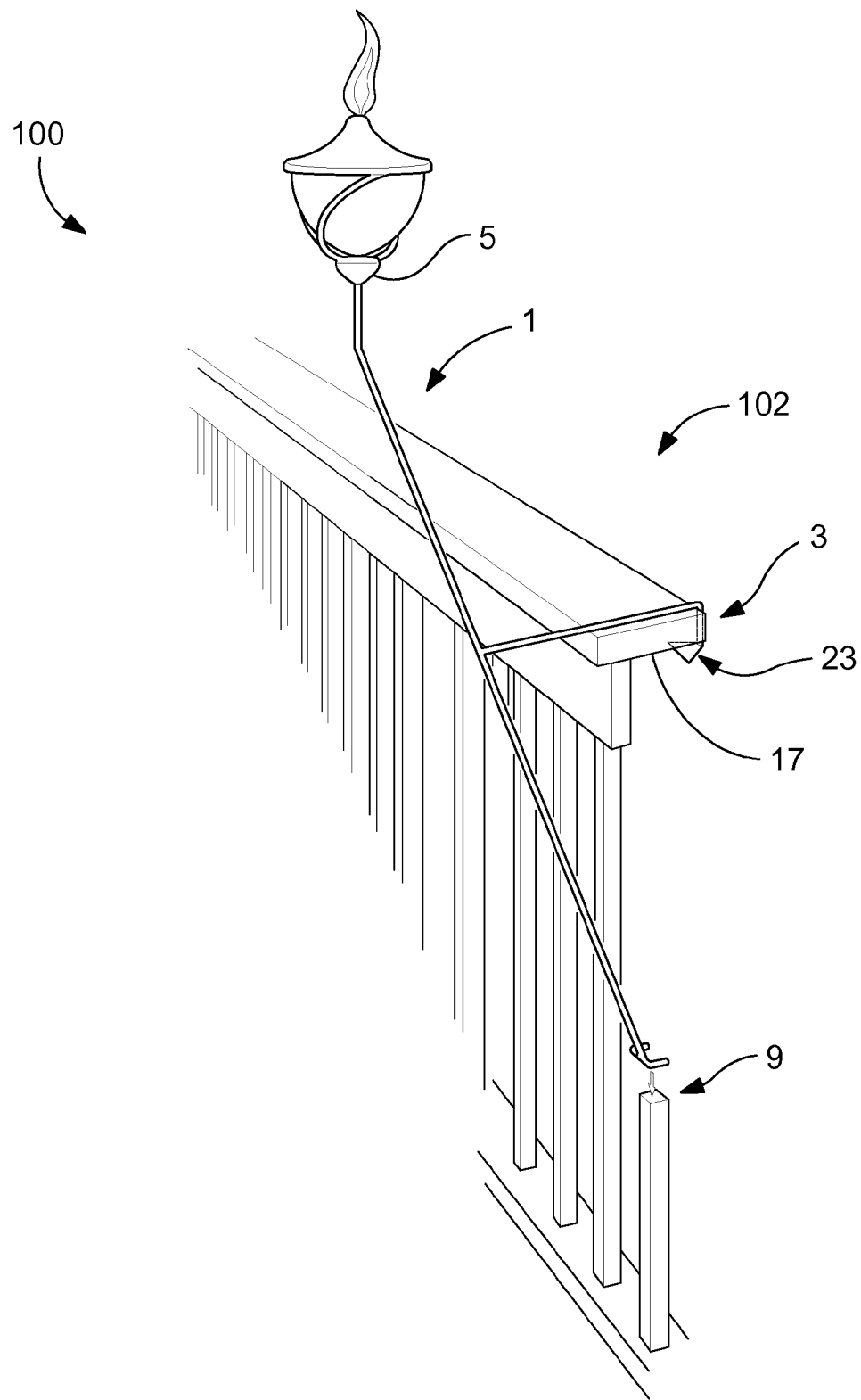
FIG. 1A is a perspective view of a support system for supporting an item on railings according to one or more embodiments of the presently disclosed subject matter.

FIG. 1A illustrates a support system, generally designated 100, for holding an item on railings. The support system 100 comprises a first member, generally designated 1, and a second member, generally designated 3. The first member 1 includes a first end and a second end. The first end of the first member 1 includes an attachment member 5 for supporting an item, such as a torch, a lamp, a lantern, a candle, and a basket. The attachment member 5 is carrying a torch in this example. The second end of the first member 1 is configured to engage a first portion, generally designated 9, of a railing, generally designated 102, such that the first member extends in a direction that is not vertical.

The first member 1 is connected to the third member such that the members define an angle. Further, when the support system 100 is attached onto the railing 102, the attachment member 5 extends substantially outwardly and vertically upwardly therefrom.

Figure 1B:
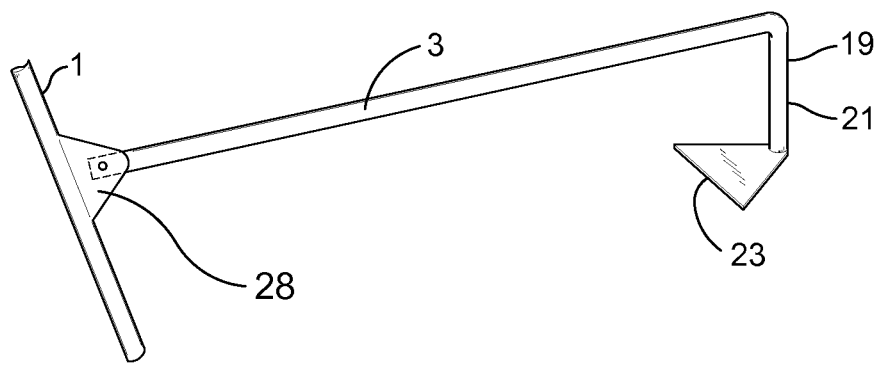
FIG. 1B is a perspective view of another support system similar to the system shown in FIG. 1A according to one or more embodiments of the presently disclosed subject matter.

FIG. 1B is a perspective view of another support system similar to the system shown in FIG. 1A according to one or more embodiments of the presently disclosed subject matter. Referring to FIG. 1B, the system 100 includes a hinged mechanism 28 for pivot of members 1 and 3 with respect to one another. Such a mechanism can facilitate the shipping and storage of the system 100.

Figure 2B:
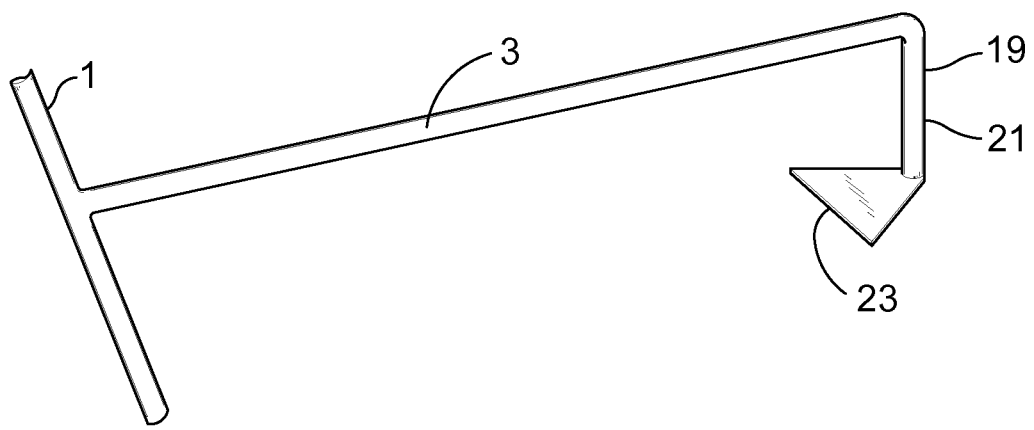
FIGS. 2A and 2B depict close perspective views of portions of the support system shown in FIG. 1A.
Figure 2A:
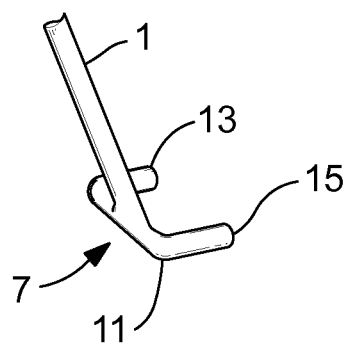

FIGS. 2A and 2B depict close perspective views of portions of the support system 100 shown in FIG. 1A. Referring to FIG. 2A, an end of the first member 1 of the support system 100 includes a railing-engaging member, generally designated 7, and includes a third member 11 having a pair of members 13 and 15. The third member 11 is securely attached to the first member 1. The pair members 13 and 15 are shaped for engaging the first portion 9 of the railing shown in FIG. 1A.

Referring to FIG. 2B, the second member 3 of the support system 100 includes a first end and a second end. The first end of the second member 3 is attached to the first member 1 of the support system 100 between the first and second ends of the first member 1. Further, the other end of the second member 3 includes a railing-engaging member 19. The railing-engaging member 19 having a third member 21. The third member 21 is attached to the second member 3, and extends substantially downwardly therefrom. The railing-engaging member 19 further includes a flat member 23 that is securely attached to the second end of the third member 21 and is positioned substantially perpendicularly thereon. The railing-engaging member 19 of the second end of the second member 3 is configured to be engaged to the railing 102 at a second portion 17 higher than a first portion 9 of the railing 102.

Figure 3:
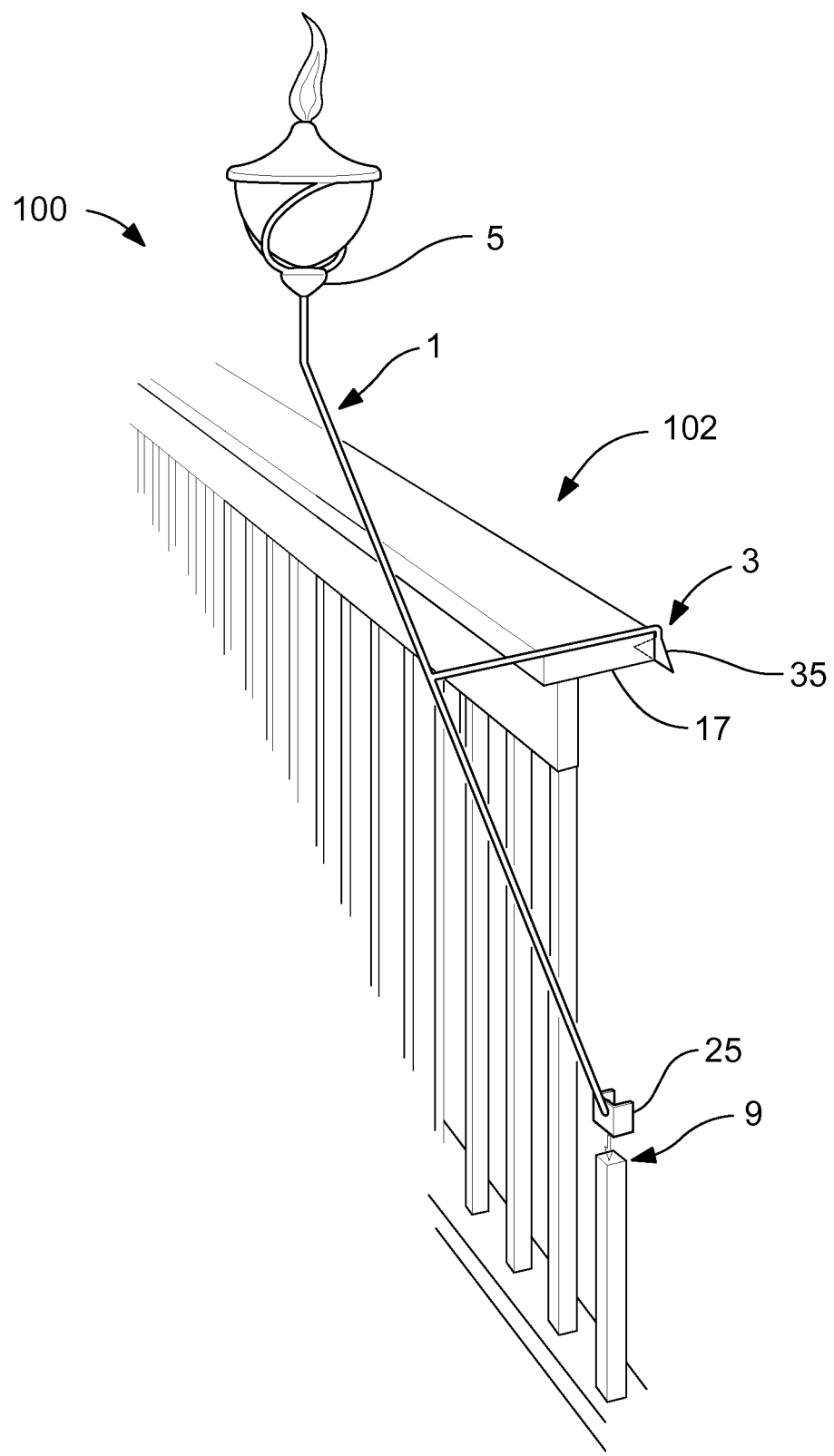
FIG. 3 is a perspective view of a support system for supporting an item on railings according to one or more embodiments of the presently disclosed subject matter.

FIG. 3 illustrates a perspective view of another support system 100 including a first member 1 and a second member 3. The system 100 of FIG. 3 is similar to the system 100 of FIG. 1A except for its members for attachment to the portions 9 and 17 of the railing 102. More particularly, the system 100 includes a flat member 35 configured to engage the second portion 17 of the railing 102. The flat member 35 is attached to the second member 3. Further, the member 25 is shaped differently as shown in FIG. 3.

Figure 1B:
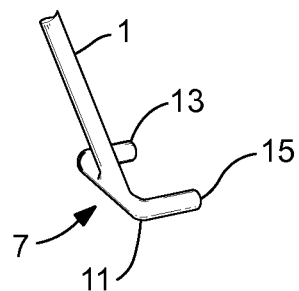
Figure 4:
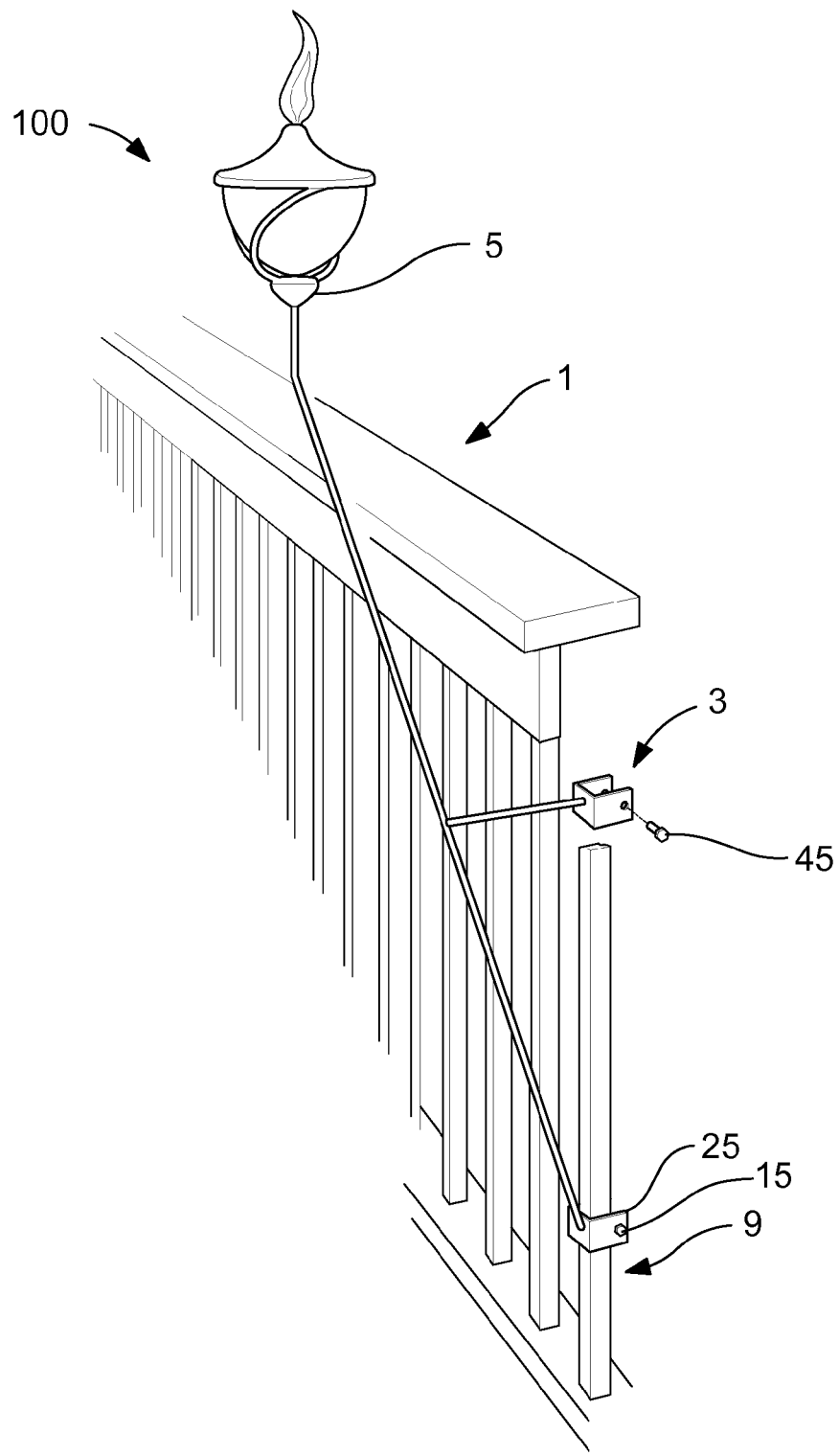
FIG. 4 is a perspective view of a support system for supporting an item on railings according to one or more embodiments of the presently disclosed subject matter.

FIG. 4 illustrates another support system 100 that is similar to the support systems of FIGS. 1 and 3. Particularly, the second member 3 is attached to a portion of the railing portion 9 that is above the attachment point of a lower portion of the system 100 to the railing portion 9. Members 3 and 25 may each be "C" shaped and define holes such that bolts 45 can be fitted there through for attaching the respective members to the railing portion 9.

Figure 5:
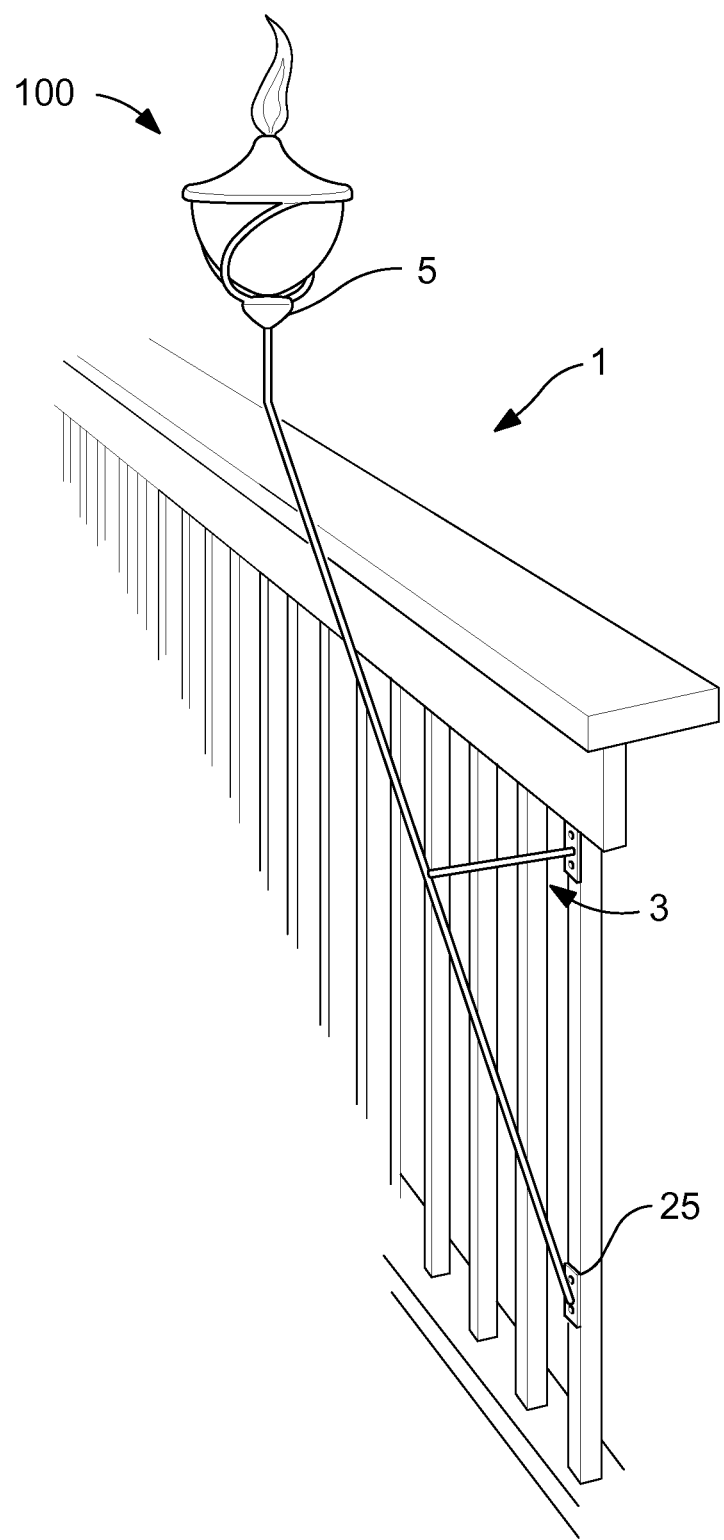
FIG. 5 is a perspective view of a support system for supporting an item on railings according to one or more embodiments of the presently disclosed subject matter.

FIG. 5 illustrates another support system 100 that is similar to the support systems of FIGS. 1 and 3. Particularly, members 3 and 25 may include flat members that can engage with the railing portion 9 and define holes for bolting the respective member to the railing portion 9.

Figure 6:
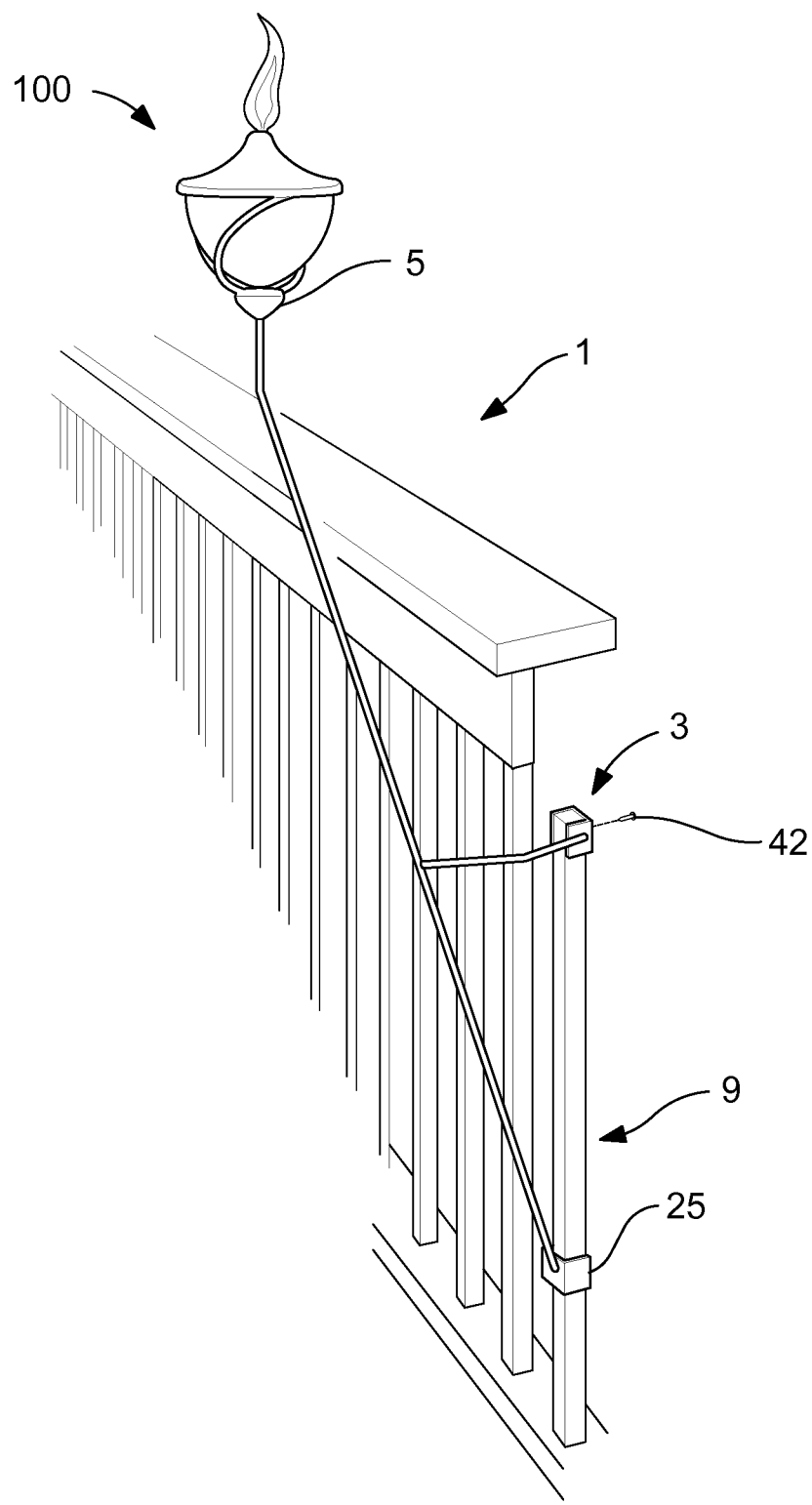
FIG. 6 is a perspective view of a support system for supporting an item on railings according to one or more embodiments of the presently disclosed subject matter.
Figure 7:
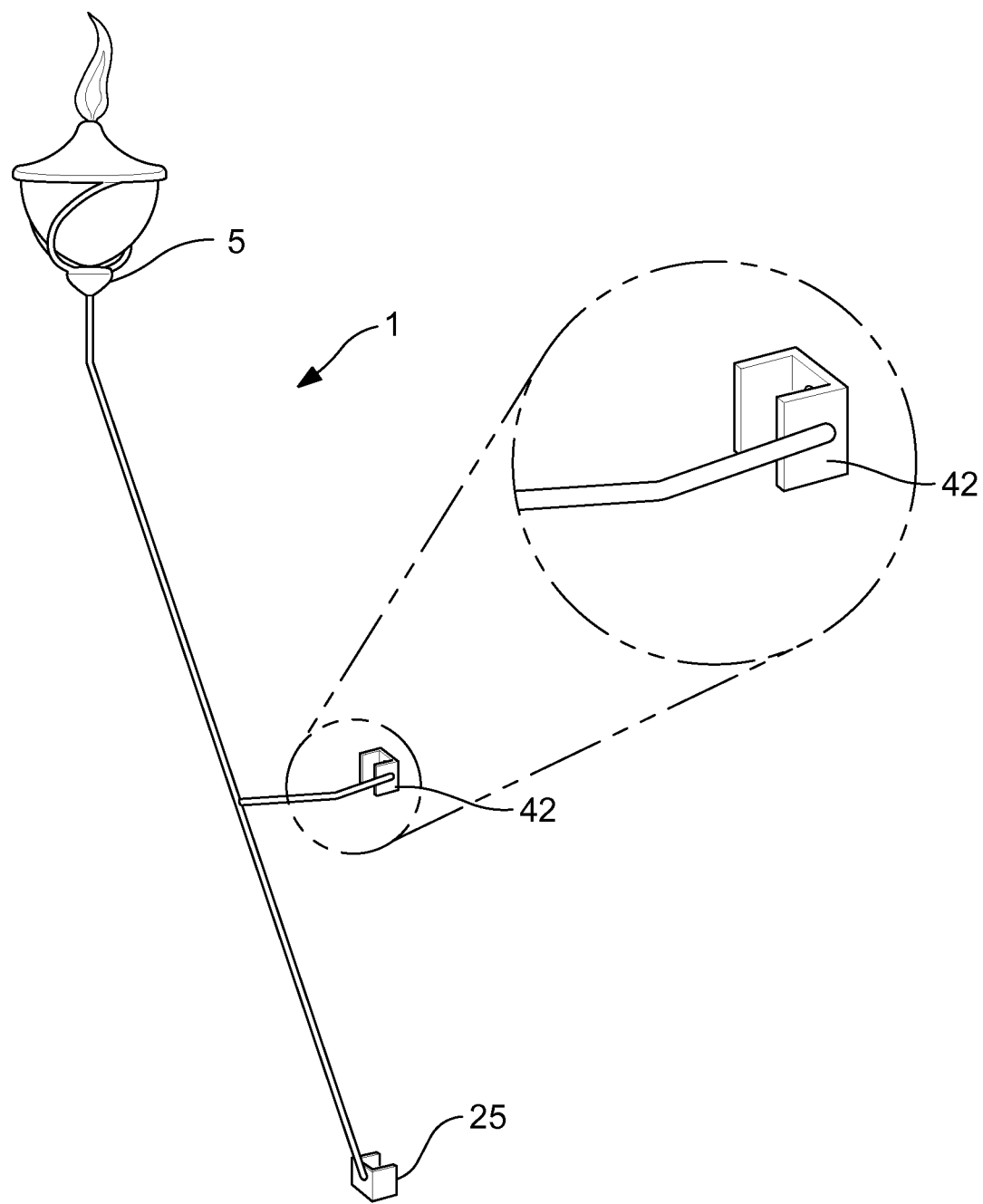
FIG. 7 is a perspective view of a support system and a close view of a portion of the support system shown in FIG. 6.

FIG. 6 illustrates a support system 100 that is similar to the support systems of FIGS. 1 and 3. Particularly, the members 3 includes a "C" shaped member 42 that can engage with the railing portion 9 and define a hole for bolting the respective member to the railing portion 9 as shown. Further, the member 25 includes a "C" shaped member for engaging the railing portion 9 as shown. FIG. 7 depicts a more detailed perspective view of the system 100 shown in FIG. 6.

Figure 8:
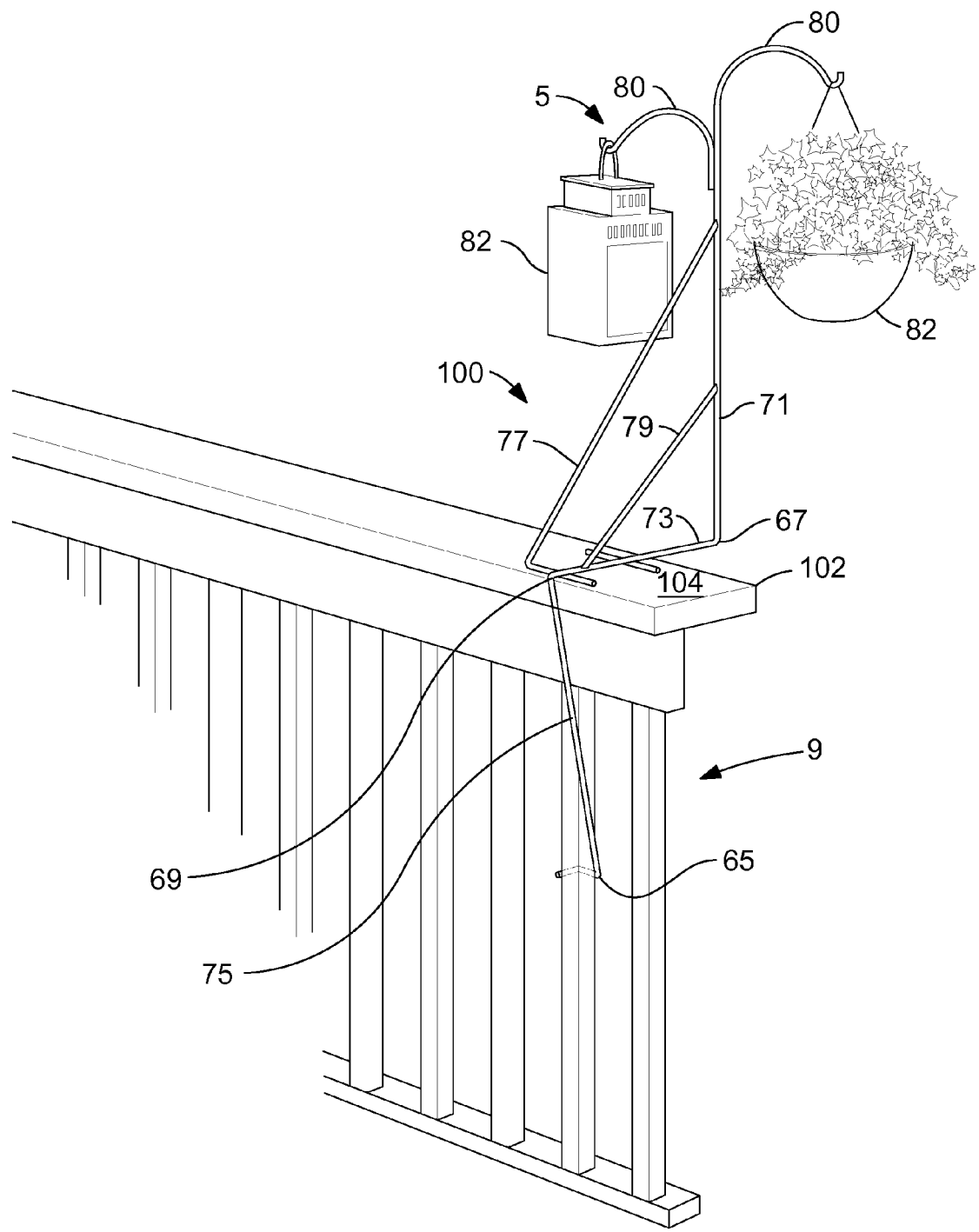
FIG. 8 is a perspective view of a support system for supporting an item on railings according to one or more embodiments of the presently disclosed subject matter.

FIG. 8 illustrates a perspective view of another support system 100. The system includes a first end and a second end. The first end includes an attachment member, generally designated 5, for supporting multiple items, such as a torch, a lamp, a lantern, a candle, a basket, or the like. The second end of the primary member 65 is configured to engage a first portion 9 of a railing 102. The system 100 defines first and second angled portions, 67 and 69, respectively, and comprises three consecutive parts marked by the bends. The three parts include: a first part 71 including the attachment-member end and extending substantially upwardly; a second part 73 extending substantially horizontally and being supported on a horizontal surface 104 of the railing 102; and a third part 75 including the rail-engaging end and extending substantially downwardly. The second part 73 is configured to be engaged to the railing 102 on its horizontal surface 104 at a higher position than the first portion 9 of the railing 102.

The support system 100 further includes multiple support members 77 and 79, each including a first and a second end. The first end of each support member 77 and 79 is attached to the first part 71. The second end of each support member 77 and 79 is attached to the second part 73 and is positioned on the railing 102 on its horizontal surface 104 supporting the second part 73.

Attachment member 5 is configured with multiple hanging members 80 onto which items 82 may be hung.

In accordance with embodiments, some or all the portions of a support system as described herein may be made of metal, plastic, the like, or any other suitable rigid material.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A support system comprising:
a first member including a first end and a second end that extends along a length in a vertical direction relative to a railing, the first end being at a top portion of the length and including an attachment member for supporting an item, and the second end being configured to engage a first portion of railing being positioned substantially vertically such that the first member and the vertical direction form an angle; and
a second member including a first end and a second end being positioned lower than the top portion of the length in the vertical direction, the first end of the second member being rigidly attached to the first member between the first and second ends of the first member, and the second end of the second member configured to be engaged to the railing at a second portion higher than the first portion of the railing;
wherein the second end of the first member includes a railing-engaging member and comprises:
a third member having a first end and a second end, separated by a central section, the central section being attached to the second end of the first member; and
a pair of members, each of the pair securely attached respectively to the first and second ends of the third member, the pair extending therefrom substantially in parallel with and toward the same direction as the second member;
wherein:
the third member is a substantially-flat member attached to the second end of the first member substantially perpendicular to the second member; and
the pair of members are substantially flat members, each of the pair being securely attached respectively to a first end and a second end of the first flat member, the pair extending therefrom substantially in parallel; and
another -substantially flat member securely attached to the second end of the second member and positioned substantially perpendicularly to the second member.

2. The support system of claim 1, wherein the second end of the first member includes a railing-engaging member and comprising:
a first substantially flat member attached to the second end of the first member substantially perpendicular to the second member; and
a pair of substantially flat members, each of the pair being securely attached respectively to a first end and a second end of the first substantially flat member, the pair extending therefrom in parallel.

* * * * *